Patented June 11, 1929.

1,717,093

UNITED STATES PATENT OFFICE.

ALBERT M. CLIFFORD, OF AKRON, OHIO, ASSIGNOR TO THE GOODYEAR TIRE & RUBBER COMPANY, OF AKRON, OHIO, A CORPORATION OF OHIO.

ANTIOXIDANT OR AGE RESISTER.

No Drawing.   Application filed February 9, 1928.   Serial No. 253,221.

My invention relates to the treatment of rubber and it has particular relation to a novel method of increasing the age-resisting properties of rubber compounds.

More specifically, the invention consists in the discovery of a new material which may be incorporated into rubber to enhance its ability to withstand aging or oxidation.

Another object of the invention consists in the provision of an antioxidant or age-retarder that is composed of a di-hydroxy di-aromatic compound.

Heretofore, it has been observed that certain phenyl hydroxy and naphthyl hydroxy compounds, when incorporated into rubber, act as preservatives or age-retarder thereof. Hydro-quinone and α-naphthol are specific examples of such materials.

This invention consists in the discovery that compounds consisting of two hydroxy aromatic molecules attached together in accordance with the type formula:

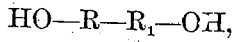

in which R and $R_1$ are aromatic groups, may be employed as antioxidants in rubber compounds with excellent results.

β-di-napthol is a specific example of a compound having the above structure which may be incorporated into rubber compounds to obtain a product having excellent aging qualities. The formula of this substance may be represented as follows:

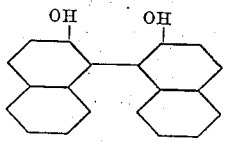

One method of preparing this material consists in the oxidation of β-naphthol in an alkaline solution with an acid solution of ferric chloride. These materials are intermixed in the ratio of 83 grams of β-naphthol and 25 grams of sodium hydroxide, dissolved in 3 liters of water. The materials are heated to their boiling point in order to obtain a complete mixture thereof and are then treated with a solution of 130 grams of ferric chloride dissolved in a solution of 100 grams of hydrochloric acid in 165 grams of water. This solution is boiled for a period of one-half hour and then is allowed to cool, after which it is filtered. A yield of 88 to 90% of theoretical value is obtained. The product may be purified by recrystallizing it from alcohol, from which it is obtained in the form of plates having a melting point of 218° C. The crystalline form of the product, together with its sharp melting point, is strongly indicative that a true chemical reaction takes place to form a definite compound. The materials prepared in accordance with this method may be introduced into various rubber compounds with very satisfactory results. The following is an example of a compound which insures an excellent product:

| | Parts. |
|---|---|
| Extracted rubber | 100 |
| Zinc oxide | 5 |
| Sulphur | 3 |
| Stearic acid | 1.5 |
| Hexamethylene tetramine | 2 |
| Antioxidant | 1 |

Samples of material prepared in accordance with the preceding formula were vulcanized at a temperature corresponding to 40 pounds steam pressure for periods of 30, 50 and 70 minutes, respectively. One set of these samples was subjected to physical tests to ascertain their elasticity and tensile strength before aging. The results of these tests are indicated in the following table:

| Cure in Mins. at 40# pressure | Tensile strength kgs./c.m.² | Per cent Elong. | Load in kgs./c.m.² at | |
|---|---|---|---|---|
| | | | 500% Elong. | 700% Elong. |
| 30 | 100 | 920 | 12 | 32 |
| 50 | 140 | 870 | 16 | 52 |
| 70 | 185 | 830 | 24 | 87 |

Another set of these samples was subjected to artificial aging in an oxygen bomb for six days at a temperature of 50° C. and a pressure of 50 pounds of oxygen per square inch. These materials were weighed both before and after aging in the bomb, in order to ascertain the percentage increase in weight due to the absorption of oxygen. The samples were also subjected to physical tests in order to ascertain their elasticity and tensile strength after artificial aging. The following table indicates the results obtained by this latter series of tests.

| Cure in Mins. at 40# pressure | Tensile strength | Per cent Elong. | Load in kgs./c.m.² at | | Per cent weight increase |
|---|---|---|---|---|---|
| | | | 500% Elong. | 700% Elong. | |
| 30 | 105 | 875 | 14 | 40 | .3 |
| 50 | 135 | 820 | 20 | 68 | .2 |
| 70 | 145 | 770 | 27 | 98 | .6 |

It will be observed from the tables that the material is an excellent antioxidant, because, to a large extent, it inhibits the absorption of oxygen by the rubber, even when the latter is subjected to the action of that element at a comparatively high temperature and for a relatively long period of time. Also, it will be observed that exposure to oxygen at a relatively high temperature only slightly impairs the elasticity and tensile strength of the rubber. Under similar conditions, if the compound had contained no antioxidant, the samples would have been reduced to resinous masses containing twelve percent or more of oxygen and would be devoid of appreciable elasticity or tensile strength.

Although I have described in detail only the preferred embodiments of the invention, it will be apparent to those skilled in the art that it is not so limited but that various minor modifications may be made therein without departing from the spirit of the invention or from the scope of the appended claims.

What I claim is:

1. A method of preserving rubber which comprises incorporating therein a material having the following structural formula: $HO-R-R_1-OH$, in which R and $R_1$ are naphthyl groups, said material being substantially a non-accelerator of the rate of vulcanization.

2. A method of preserving rubber which comprises incorporating therein a di-naphthol.

3. A method of preserving rubber which comprises incorporating therein a di-naphthylene having a hydroxyl group substituted therein.

4. A method of preserving rubber which comprises incorporating therein a $\beta$-di-naphthol.

5. A rubber product that has been vulcanized in the presence of a material having the following structural formula: $HO-R-R_1-OH$, in which R and $R_1$ are naphthyl groups, said material being substantially a non-accelerator of the rate of vulcanization.

6. A rubber product that has been vulcanized in the presence of a di-naphthyl radical having at least one hydroxy group attached thereto.

7. A rubber product that has been vulcanized in the presence of $\beta$-di-naphthol.

In witness whereof, I have hereunto signed my name.

Signed at Akron, in the county of Summit and State of Ohio, U. S. A., this 8th day of February, 1928.

ALBERT M. CLIFFORD.